United States Patent [19]

Tsuchida et al.

[11] Patent Number: 5,168,617
[45] Date of Patent: * Dec. 8, 1992

[54] AXIALLY CENTERING APPARATUS FOR FUSION-BONDING OPTICAL FIBERS

[75] Inventors: Yoshio Tsuchida; Tomoki Takahashi, both of Hiratsuka; Shuji Kajitani, Matsue, all of Japan

[73] Assignee: The Furukawa Electric Co., Ltd., Tokyo, Japan

[*] Notice: The portion of the term of this patent subsequent to Apr. 10, 2007 has been disclaimed.

[21] Appl. No.: 688,389

[22] Filed: Apr. 22, 1991

Related U.S. Application Data

[60] Continuation of Ser. No. 469,080, Jan. 23, 1990, abandoned, which is a division of Ser. No. 114,659, Oct. 23, 1987, Pat. No. 4,914,797.

[30] Foreign Application Priority Data

| Oct. 27, 1986 [JP] | Japan | 61-254958 |
| Oct. 27, 1986 [JP] | Japan | 61-254959 |
| Oct. 27, 1986 [JP] | Japan | 61-254960 |

[51] Int. Cl.$^5$ .............................................. B25B 27/14
[52] U.S. Cl. .................................. 29/281.1; 29/281.5; 269/43
[58] Field of Search ........................... 29/281.1, 281.5; 269/43, 45, 60, 73, 71

[56] References Cited

U.S. PATENT DOCUMENTS 2,428,958 10/1947 Bohaboy et al. .................. 29/281.1

Primary Examiner—J. J. Swann
Attorney, Agent, or Firm—Foley & Lardner

[57] ABSTRACT

An axially centering apparatus for fusion-bonding optical fibers comprising a pair of guides having long grooves on the upper surfaces thereof for engaging optical fibers, a pair of fulcra formed in parallel with the long grooves of the guides for supporting the guides, a pair of centering stands having substrates for supporting the fulcra, a pair of centering mechanisms having load imparting mechanism sections having telescopic output ends, load imparting mechanism sections, and transmitting mechanism sections for the adjusting mechanism sections so that the long grooves of said centering stands are disposed adjacent to each other to align in a rectilinear line, said centering mechanisms are associated with the centering stands to contact the output ends of the centering mechanisms with the guides of the centering stands, wherein said one centering stand satisfies the conditions that the fulcrum 3A and the long groove 4A are relatively positioned so that the crossing angle $\alpha$ (alpha) between a line segment $AL_1$ and a perpendicular $AL_2$ becomes 45°, where $AO_1$ is the center of the fulcrum as seen from the plane perpendicular to the long groove, $AO_2$ is the center of the long groove, $AL_1$ is the line segment passing the centers $AO_1$ and $AO_2$, and $AL_2$ is a perpendicular passing the center $AO_1$ of the long groove, and similarly, the other centering stand satisfies the conditions that the crossing angle $\beta$ (beta) between a line segment $LB_1$ and a perpendicular $AL_2$ becomes 45°, where $BO_1$ is the center of the fulcrum, $BO_2$ is the center of the long groove, $BL_1$ is the line segment passing the centers $BO_1$ and $BO_2$, and $BL_2$ is a perpendicular passing the center $BO_1$ of the long groove, and the pair of centering stands disposed adjacent to each other are perpendicularly crossed at both line segments $AL_1$ and $BL_1$, and the output ends of the pair of centering mechanisms are disposed on the same plane to be contacted with the guides of the centering stands.

1 Claim, 8 Drawing Sheets

AXIALLY CENTERING APPARATUS FOR FUSION-BONDING OPTICAL FIBERS

This application is a continuation of application Ser. No. 07/469,080, filed Jan. 23, 1990, now abandoned, which is a divisional of Ser. No. 07/114,659, filed Oct. 23, 1987, now U.S. Pat. No. 4,914,797.

BACKGROUND OF THE INVENTION

This invention relates to an axially centering apparatus used for centering optical fibers to be connected in case of fusion-bonding the optical fibers end to end.

When a pair of optical fibers to be connected are fusion-bonded, the axial centers of the ends of the optical fibers to be connected are accurately brought into coincidence, the ends of the optical fibers to be connected are opposed and fusion-bonded so as to suppress an increase in the transmission loss of the connecting portions of the optical fibers known per se.

In an operation of bringing the axial centers of the optical fibers to be connected, i.e., in an operation of axially centering the ends of the optical fibers to be connected as shown in FIG. 14, coating layers are removed from the end portions of a pair of coated optical fibers $F_{11}$ and $F_{21}$ to be connected, the bare end portions $F_{12}$ and $F_{22}$ of the optical fibers are cut and aligned, the end portions $F_{12}$ and $F_{22}$ of the optical fibers are opposed at a predetermined interval of the end faces of the end portions of the optical fibers, and finely adjusted in X-axis direction and Y-axis direction.

Various types of centering stands used for axially centering the end portions of the optical fibers to be connected have been proposed, and that disclosed in Japanese Patent Laid-open No, 111120/1984 is commonly used at present, and the conventional example will be described with reference to FIGS. 15 to 17.

In a centering stand 100A for finely adjusting in an X-axis direction in FIG. 15, a guide 102A having a long groove 101A for engaging an optical fiber on the upper surface is supported through a fulcrum 104A formed on a flat base 103A, and the center $X_1$ of the long groove 101A and center $X_2$ of the fulcrum 104A are aligned on the same vertical line.

In a centering stand 100B for finely adjusting in a Y-axis direction shown in FIG. 16, a guide 102B having a long groove 101B for engaging an optical fiber on the upper surface is supported through a fulcrum 104B formed on the upper inside surface of an angle type base 103B, and the center $Y_2$ of the long groove 101B and the center $Y_2$ of the fulcrum 104B are aligned on the same horizontal line.

Both the centering stands 100A and 100B are opposed fixedly to align the long grooves 101A and 101B along a rectilinear line as shown in FIG. 17.

In FIG. 17, when an external force (load) of a direction Fx is applied to the guide 102A, the fulcrum 104A is elastically deformed in the same direction in response to the external force, and the guide 102A is finely moved in the X-axis direction. Thus, the end portion $F_{12}$ of the optical fiber engaging in the long groove 101A of the guide 102A is finely adjusted in the X-axis direction.

In FIG. 17, when an external force of a direction Fy is similarly applied to the guide 102B, the fulcrum 104B is elastically deformed in the same direction in response to the external force, and the guide 102B is finely moved in the Y-axis direction. Thus, the end portion $F_{22}$ of the optical fiber engaging in the long groove 101B of the guide 102B is finely adjusted in the Y-axis direction.

Thus, the end portions $F_{12}$ and $F_{22}$ of both the optical fibers are axially centered.

When a load is applied to the centering stand, means shown in FIG. 18 is used in general.

A lateral load imparting mechanism 200 in FIG. 18 includes a motor 203 in which a gear 202 is mounted on a motor shaft 201, a rotational shaft 205 on which a gear 204 engaging with the gear 202 is mounted, a movable block 206 moving forward or reversely in the axial direction of the shaft 205 upon normal or reverse rotating of the shaft 205, a push shaft 207 provided at the end side of the block 206, and a spring 209 mounted on a push shaft 207 between the movable block 206 and a supporting plate 208, and the push shaft 207 disposed at the end side of the movable block 206 is contacted with the guide 102A of the centering stand 100A.

A plurality of projections 210, 211 made of conductors are formed at an axial interval on the outer peripheral surface of the movable block 206, an origin detecting pin 212, and overrun detecting pins 213, 214 are disposed at a predetermined interval in a manner capable of being contacted with the projections 210, 211 and the pins 212, 213, 214 are held through an insulating holder 215.

The intervals of the projections 210, 211, and the pins 212, 213, 214 are set according to an empirical rule, and the interval of the overrun detecting pins 213, 214 corresponds to the moving range of the movable block 206 to be described later.

The projections 210, 211 and the pins 212, 213, 214 respectively become electric contacts, and are electrically connected to a warning mechanism, a displaying mechanism, etc., not shown.

In the load imparting mechanism 200 in FIG. 18, when the motor 203 is rotated normally or reversely, the rotation of the motor 203 is transmitted through the motor shaft 201, and the gears 202, 204 to the rotational shaft 205 to move forward or reversely movable block 206 through the rotational shaft 205. Thus, a load of Fx direction is applied through the push shaft 207 at the end of the movable block to the guide 102A of the centering stand 100A to reduce the load or to erase the load, and the guide 102A is finely moved in a predetermined direction in the amount of the applied load.

In this case, the projections 210, 211 of the movable block 206 are contacted with any of the origin cetecting pin 203 or the overrun detecting pins 213, 214 to notify and display the finely moving state of the guide 102A by the warning mechanism, the displaying mechanism electrically connected to them. Thus, the guide 102A is avoided to be displaced out of the adjusting range to be efficiently adjusted and the original position of the guide 102A is identified.

The centering stand 100 which has been omitted for the description is associated vertically with the load imparting mechanism 200 of FIG. 18, which is used similarly to the above-mentioned operation.

In the above-described conventional axially centering apparatus, the external forces of Fx or Fy direction are applied to the guides 102A, 102B of the centering stands 100A, 100B to be simply finely adjusted in X-axis and Y-axis directions, and the respective adjusting systems are independent from each other. Thus, the high adjusting accuracy is secured.

However, since the constitutions of the centering stands 100A, 100B are different, they are uneconomic due to the necessity of the two types of centering stands.

Further, since the load imparting mechanisms associated with the centering stands 100A, 100B must apply different forces, Fx and Fy, in the x and y directions, the operability is complicated, and since the load imparting mechanisms are bulky elevationally and laterally, the entire apparatus cannot be reduced in size.

SUMMARY OF THE INVENTION

Accordingly, an object of this invention is to provide an axially centering apparatus for fusion-bonding optical fibers which is economic, can be reduced in size and can satisfy the operability.

In order to achieve the above and other objects, there is provided according to this invention an axially centering apparatus for fusion-bonding optical fibers comprising a pair of guides having long grooves on the upper surfaces thereof for engaging optical fibers, a pair of fulcra formed in parallel with the long grooves of the guides for supporting the guides, a pair of centering stands having substrates for supporting the fulcra, a pair of centering mechanisms having load imparting mechanism sections having telescopic output ends, load imparting mechanism sections, and transmitting mechanism sections for the adjusting mechanism sections so that the long grooves of said centering stands are disposed adjacent to each other to align in a rectilinear line, said centering mechanisms are associated with the centering stands to contact the output ends of the centering mechanisms with the guides of the centering stands, wherein said one centering stand satisfies the conditions that the fulcrum 3A and the long groove 4A are relatively positioned so that the crossing angle $\alpha$ (alpha) between a line segment $LA_1$ and a perpendicular $AL_2$ becomes 45°, where $AO_1$ is the center of the fulcrum as seen from the plane perpendicular to the long groove, $AO_2$ is the center of the long groove, $AL_1$ is the line segment passing the centers $AO_1$ and $AO_2$, and $AL_2$ is a perpendicular passing the center $AO_1$ of the long groove, and similarly, the other centering stand satisfies the conditions that the crossing angle $\beta$ (beta) between a line segment $LB_1$ and a perpendicular $AL_2$ becomes 45°, where $BO_1$ is the center of the fulcrum, $BO_2$ is the center of the long groove, $BL_1$, is the line segment passing the centers $BO_1$ and $BO_2$, and $BL_2$ is a perpendicular passing the center $BO_1$ of the long groove, and the pair of centering stands disposed adjacent to each other are perpendicularly crossed at both line segments $AL_1$ and $BL_1$, and the output ends of the pair of centering mechanisms are disposed on the same plane to be contacted with the guides of the centering stands.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Embodiments of an axially centering apparatus for fusion-bonding optical fibers according to the present invention will be described in detail with reference to the accompanying drawings.

Figure 1:
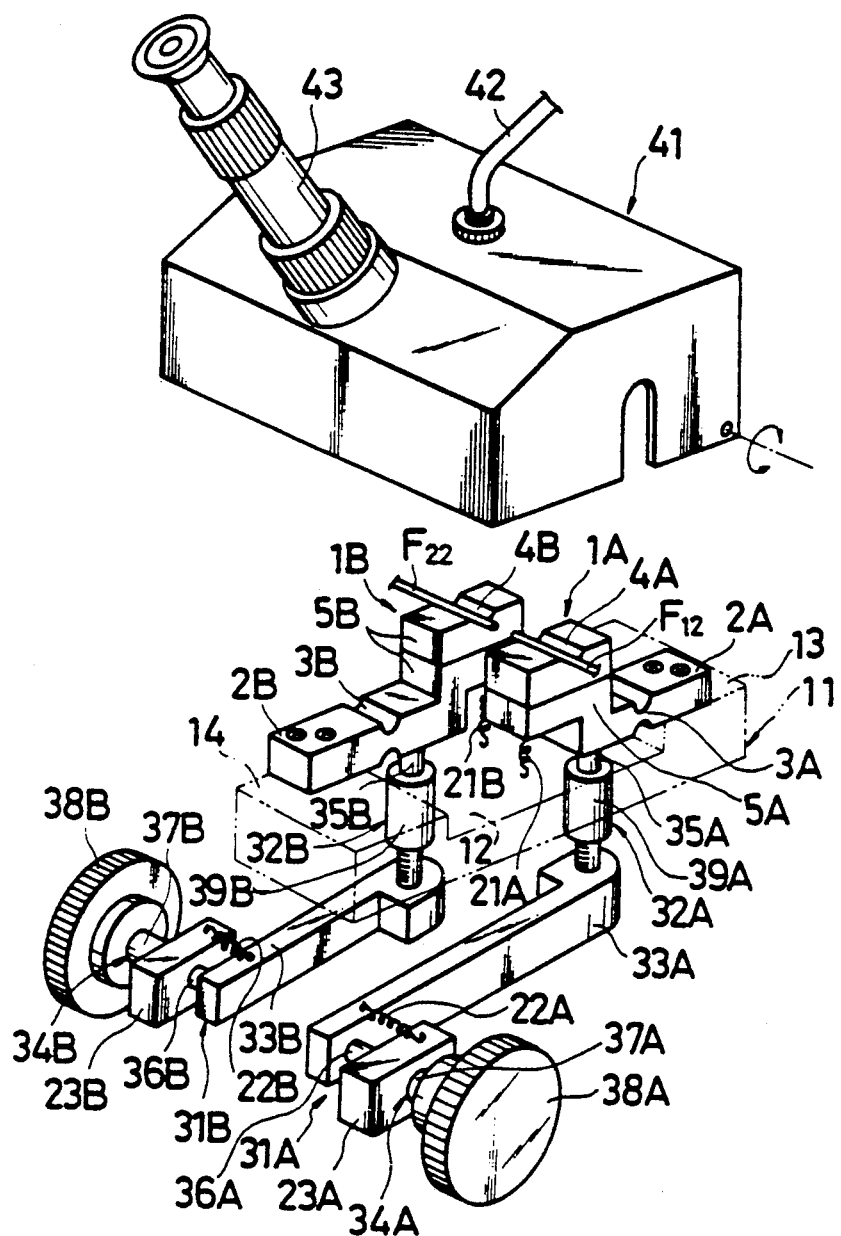
FIGS. 1, 2 and 3 are perspective, side and plan views showing an embodiment of an axially centering apparatus for fusion-bonding optical fibers according to the present invention.
Figure 2:
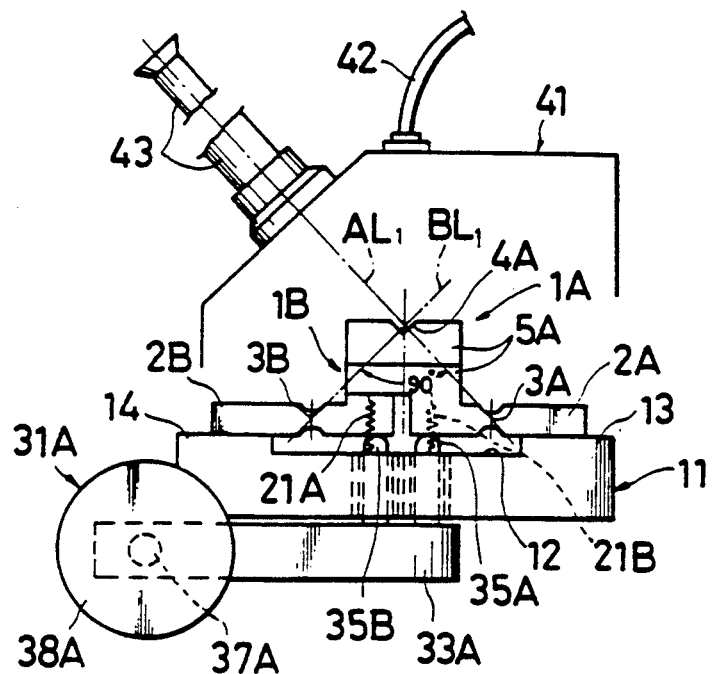
Figure 3:
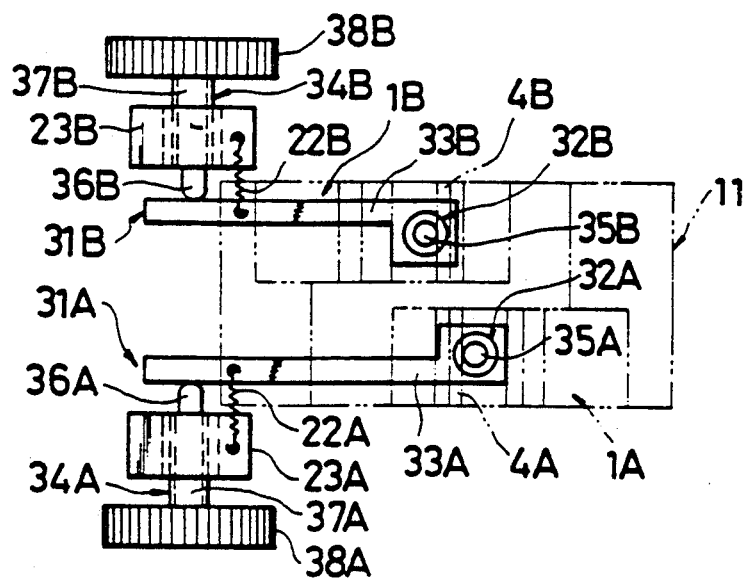

In FIG. 1 to 3 showing a first embodiment of the present invention, a pair of centering stands 1A and 1B have equal structures and shapes.

More specifically, a pair of centering stands 1A and 1B have respectively platelike substrates 2A and 2B, fulcra 3A and 3B bent in recess shape on both upper and lower surfaces, V-shaped long grooves 4A and 4B on the upper surfaces for engaging optical fibers, and guides 5A and 5B bent at the lower surfaces in a crank shape.

In the relative relationships of these sections, the fulcra 3A and 3B are respectively provided over both front or rear sides of the substrates 2A and 2B, and the guides 5A and 5B are supported through the fulcra 3A and 3B so that the fulcrum 3A and the long groove 4A, and the fulcrum 3B and the long groove 4B are provided in parallel with each other.

Figure 4:
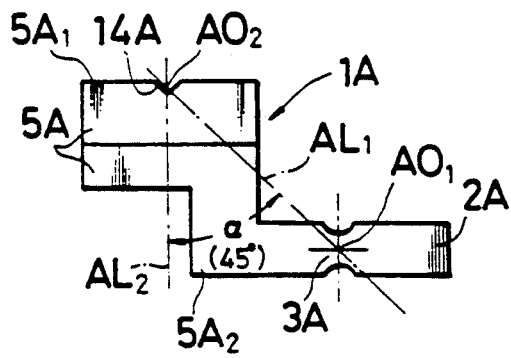
FIGS. 4 and 5 are side views showing the centering stands of the embodiment.
Figure 7:
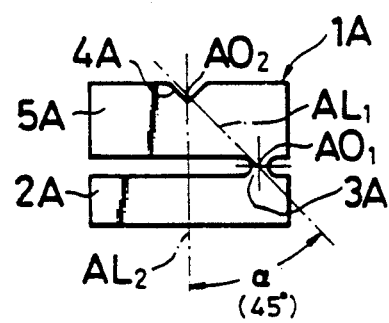
FIGS. 6, 7, and 8, 9 are plan and side views showing other examples of the centering stands of the apparatus of the invention.

In one centering stand 1A as shown in the right side of FIG. 4, the fulcrum 3A and the long groove 4A are relatively positioned so that the crossing angle $\alpha$ (alpha) between a line segment $AL_1$ and a perpendicular $AL_2$ becomes 45° in the plane or section perpendicular to the long groove 4A, where $AO_1$ is the center of the fulcrum 3A, $AO_2$ is the center of the long groove 4A, $AL_1$ is the line segment for connecting both the centers $AO_1$ and $AO_2$, and $AL_2$ is a perpendicular passing the center $AO_1$ of the long groove 4A.

Figure 5:
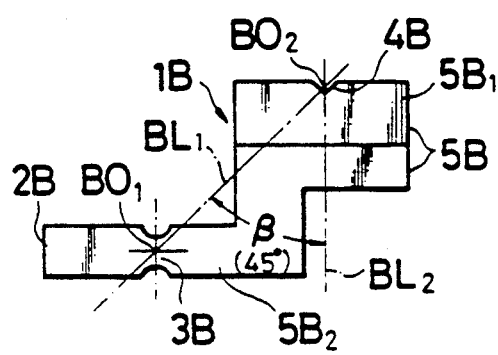
Figure 8:
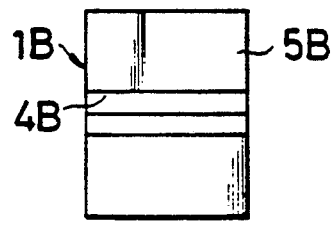
Figure 6:
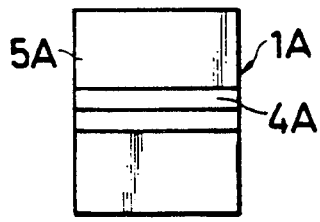
Figure 9:
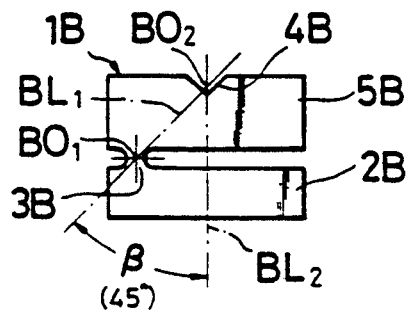

Similarly, in the other centering stand 1B as shown in the right side of FIG. 5, the fulcrum 3B and the long groove 4B are relatively positioned so that the crossing angle $\beta$ (beta) between a line segment $BL_1$ and a perpendicular $BL_2$ becomes 45° in the plane or section perpendicular to the long groove 4B, where $BO_1$ is the center of the fulcra 3B, $BO_2$ is the center of the long groove 4A, $BL_1$ is the line segment for connecting both the centers $BO_1$ and $BO_2$, and $BL_2$ is a perpendicular passing the center $BO_1$ of the long groove 4B.

The centering stands 1A and 1B may be integrally formed by cutting and polishing a metal block made, for example, of steel, but the guides 5A and 5B are ordinarily formed of ceramics at parts $5A_1$ and $5B_1$ having the long grooves 4A and 4B, of metals at the other portions $5A_2$ and $5B_2$, and the ceramic parts $5A_1$ and $5B_2$ are bonded to the metal portions 5A₂ and 5B₂ as apparent from FIGS. 4 and 5.

In FIGS. 1 to 3, a recess 12 and two mounts 13 and 14 opposed through the recess 12 are formed on the centering stand mounting base 11, and the two centering stands 1A and 1B are disposed fixedly symmetrically on the mounts 13 and 14.

More specifically, in one centering stand 1A, the substrate 2A is disposed on the mount 13 of the centering stand mounting base 11, the guide 5A is disposed to be positioned in the recess 12 of the base 11, and the substrate 2A is clamped by screws to the mount 13 of the base 11.

Similarly, in the other centering stand 1B, the substrate 2B is disposed on the mount 14 of the centering stand mounting base 11, the guide 5B is disposed to be positioned in the recess 12 of the base 11, and the substrate 2B is clamped by screws to the mount 14 of the base 11.

In this mounting state, the long groove 4A and 4B of both the centering stands 1A and 1B are aligned on a rectilinear line, and, as shown in FIG. 2, the line segment $AL_1$ of the centering stand 1A and the line segment $BL_1$ of the centering stand 1B are disposed perpendicularly to each other.

As described above, downward tensile forces are applied through tension type springs 21A and 21B mounted over the lower surfaces of the guides 5A and 5B and the recess 12 of the base 11 to both the centering stands 1A and 1B mounted on the base 11.

Further, centering mechanisms 31A and 31B having respective load imparting mechanism sections 32A and 32B, transmitting mechanism sections 33A and 33B, and adjusting mechanism sections 34A and 34B are associated respectively with the centering stands 1A and 1B.

The load imparting mechanism sections 32A and 32B of the centering mechanism 31A and 31B are constructed to be operated by micrometers, i.e., are respectively composed of known micrometers 39A and 39B having spindles, sleeves, thimbles, wherein output ends 35A and 35B by axially telescopic spindles are contacted with the lower surfaces of the guides 5A and 5B of the centering stands 1A and 1B.

The transmitting mechanism sections 33A and 33B of the centering mechanisms 31A and 31B are respectively formed of transmitting levers, and respectively mounted at the ends on the base ends of the load imparting mechanism sections 32A and 32B.

The adjusting mechanisms 34A and 34B of the centering mechanisms 31A and 31B are respectively composed of micrometers 37A and 37B having output ends 36A and 36B similarly as described above, and centering dials 38A and 38B attached to the operating ends of the micrometers 37A and 37B.

Such adjusting mechanism sections 34A and 34B are respectively supported through supports 23A and 23B, the output ends 36A and 36B are contacted with the end of the transmitting mechanism sections 33A and 33B, and tension type springs 22A and 22B for holding the contacting states are mounted over the ends of the transmitting mechanism sections 33A and 33B and the supports 23A and 23B.

An example of using the apparatus of the invention constructed as described above will be described.

In FIGS. 1 to 3, when the centering dial 38A of the adjusting mechanism section 34A of the centering mechanism 31A is rotated clockwise to move forward the output end 36A of the micrometer 37A in a predetermined direction, the transmitting mechanism section 33A is pushed clockwise through the output end 36A, the movement is transmitted to the micrometer 39A of the load imparting mechanism section 32A, thereby moving upward the output end 35A of the micrometer 39A.

The guide 5A of the centering stand 1A is lifted by the upward movement of the output end 35A of the micrometer 39A, and the guide 5A is finely moved obliquely upward with the fulcrum, 3A as a fulcrum thereby displacing the center of the long groove 4A obliquely upward along the line segment $AL_1$ of FIG. 2.

When the centering dial 38A of the adjusting mechanism section 34A of the centering mechanism 31B is, on the contrary, rotated counterclockwise to move backward the output end 36A of the micrometer 37A in a predetermined direction, the transmitting mechanism section 33A is returned counterclockwise through the tension type spring 22A, the movement is transmitted to the micrometer 39A of the load imparting mechanism section 32A, thereby moving downward the output end 35B of the micrometer 39A.

Thus, the guide 5A of the centering stand 1A is moved down through the tension type spring 21A, the guide 5A is finely moved obliquely downward with the fulcrum 3A as a fulcrum, thereby displacing the center of the long groove 4A obliquely downward along the line segment $AL_1$ in FIG. 2.

In the centering mechanism 31B is operated similarly, when the centering dial 38B of the adjusting machanism section 34B is rotated clockwise or counterclockwise, the output end 36B of the micrometer 37B of the adjusting mechanism section 34B is moved forward or backward in a predetermined direction. Thus, the output end of the micrometer 39B of the load imparting mechanism section 32B is moved upward or downward. Thus, the guide 5B of the centering stand 1B is lifted through the output end 35B, or moved down through the tension type spring 21B.

As a result, the guide 5B is finely moved obliquely upward or downward with the fulcrum 3B as a fulcrum, and the center of the long groove 4B is displaced along the line segment $BL_1$ of FIG. 2.

As described above, the guides 5A and 5B of the centering stands 1A and 1B are elastically deformed through the centering mechanisms 31A and 31B to finely displace the centers of the long grooves 4A and 4B of the guides 5A and 5B along the line segments $AL_1$ and $BL_1$ perpendicular to each other.

Therefore, when the end portions $F_{12}$ and $F_{22}$ of the optical fibers are respectively engaged within the long grooves 4A and 4B of the guides 5A and 5B to be held and are finely moved along the line segments $AL_1$ and $BL_1$ through the centering mechanisms 31A and 31B, the axial centering of bringing the cores of both the optical fibers into coincidence with each other is performed.

In a concrete example, in case that the axial distance between both the output ends 35A and 36A is 55 mm, the distance between the center $AO_1$ of the fulcrum and the center $AO_2$ of the long groove is 200 mm and the moving distance of the output end 36A when the centering dial 38A is rotated by one revolution is 0.5 mm, and the moving distance of the output end 35A when the load imparting mechanism section 32A is rotated by one revolution is 0.5 mm, the end 2A of the optical fiber engaging within the long groove 4A of the guide 5A is moved by 0.1 micron by rotating the centering dial 38A at 26°.

In case of the guide 5B in which the dimensions are the same as those in the above-mentioned case except the axial distance of both the output ends 35B and 36B is 35 mm, the end 2B of the optical fiber engaging within the long groove 4B of the guide 5B is moved by 0.1 micron by rotating the centering dial 38B at 26°.

Other embodiments of the invention will be described with respect to the construction.

Centering stands 1A and 1B in FIG. 6–7 and 8–9 are composed, similarly to the previous embodiment, of substrates 2A and 2B, fulcra 3A and 3B, and guides 5A and 5B having long grooves 4A and 4B, respectively, which are formed of the materials similarly to those described above in the previous embodiment. In this embodiment, the configurations are the same as those in the previous embodiment except that fulcra 3A and 3B are formed on the upper surfaces of the substrates 2A and 2B, both the front and rear sides of the fulcra 3A and 3B are bent in recess shape, and the guides 5A and 5B are formed in block shape.

The centering stands 1A and 1B of these embodiments described above are mounted on the mounts 13 and 14 of the base 11 to perpendicularly cross both the line segments $AL_1$ and $BL_1$ described above, and the centering mechanisms 31A and 31B are associated with the centering stands 1A and 1B to contact the output ends 35A and 35B of the load imparting mechanism sections 32A and 32B with the upper surfaces of the guides 5A and 5B.

The adjusting mechanism sections 34A and 34B of the centering mechanisms 31A and 31B may be altered to manual type as described above or may be type driven mainly by motors such as pulse motors or step motors. In this case, gear transmission systems are employed as the transmitting mechanism sections 33A and 33B over the motor shafts of the adjusting mechanism sections 34A and 34B and the load imparting mechanism sections 32A and 32B.

The end faces of the spindles to become the output ends 35A, 35B and 36A, 36B of the load imparting mechanism sections 32A and 32B and the adjusting mechanism sections 34A and 34B of the centering mechanisms 31A and 31B are preferably made of spherical shape having small frictional resistances and the ends of the spindles are preferably formed of ceramics having high wear resistances.

The means for telescoping the output ends through the micrometers may be replaced by precise threading means.

When the upper surfaces of the centering stands 1A and 1B are covered, for example, with hoods 41 shown in FIGS. 1 and 2, the hoods 41 may be provided with hinges for opening.

When such hoods 41 are provided, for example, with illuminators 42 such as light guides, microscopes 43 for inspecting the ends of the optical fibers, the illuminators 42 and the microscopes 43 are mounted at the positions corresponding to the centers (the opposed positions of the ends of the optical fibers) between the guides 5A and 5B so that the optical axes of the microscopes 43 are mounted on the hoods 41 in such a manner to be the same slope as the line segment $AL_1$, i.e., 35°.

Centering, and displaying means provided in the apparatus of the invention will be described with reference to FIGS. 10 to 13.

In the cases of FIGS. 10 to 13, the axially centering mechanisms are fundamentally constructed the same as the previous embodiments except that adjusting mechanism sections 34A and 34B of centering mechanisms 31A and 31B corresponding to centering and displaying means are different from those of the above-mentioned embodiments as will be described.

The adjusting mechanism sections 34A and 34B respectively comprise micrometers 37A and 37B having output ends 36A and 36B of spindles, centering dials 38A and 38B attached to the operating ends of the micrometers 37A and 37B, movable bodies 60A and 60B telescoping through the micrometers 37A and 37B, guide members $51A_1$, $51A_2$ and $51B_1$, $51B_2$ for guiding the movable bodies 50A and 50B in predetermined directions, and supporting members $52A_1$, $52A_2$ and $52B_1$, $52B_2$ for supporting the guide members $51A_1$, $51A_2$ and $51B_1$, $51B_2$ at predetermined positions in predetermined states.

Figure 10:
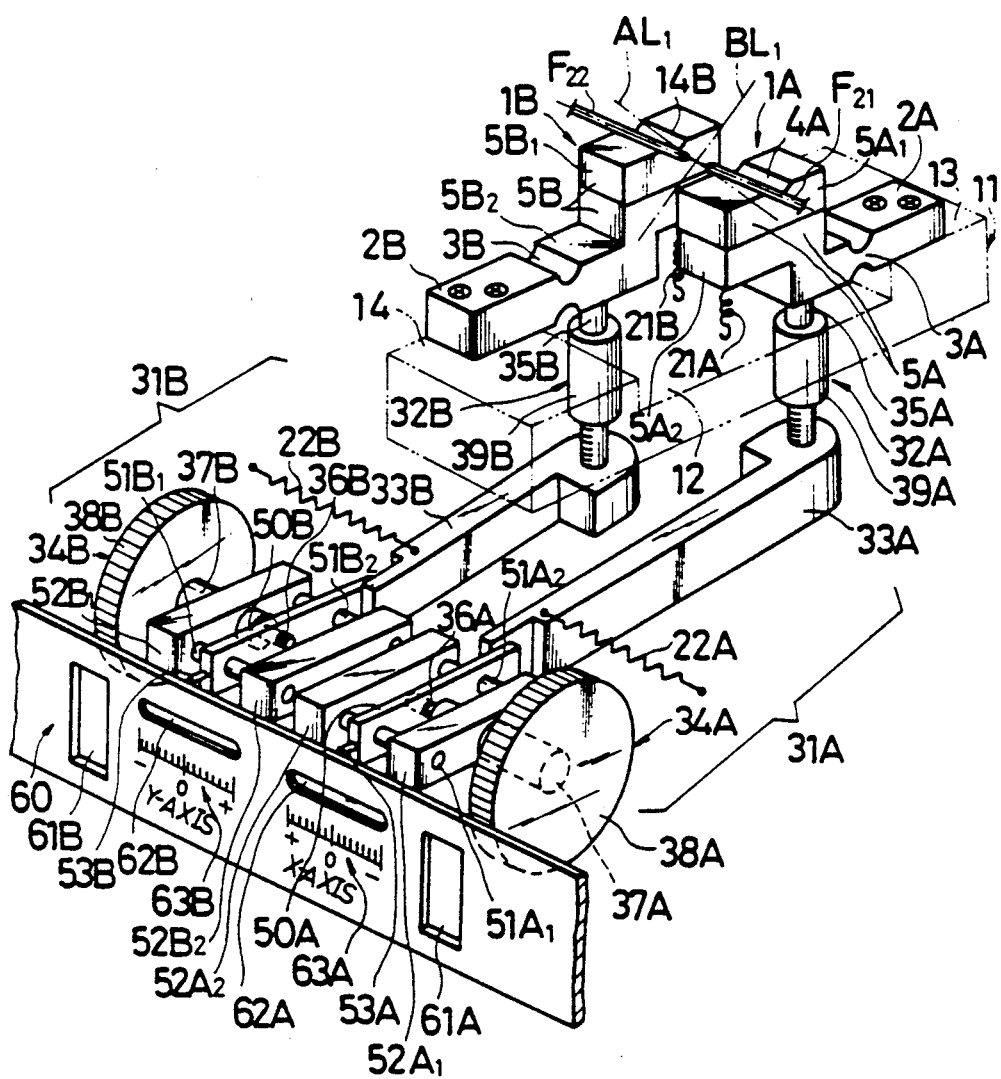
FIGS. 10 and 11 are perspective and side views of the apparatus of the invention having centering displaying means.
Figure 11:
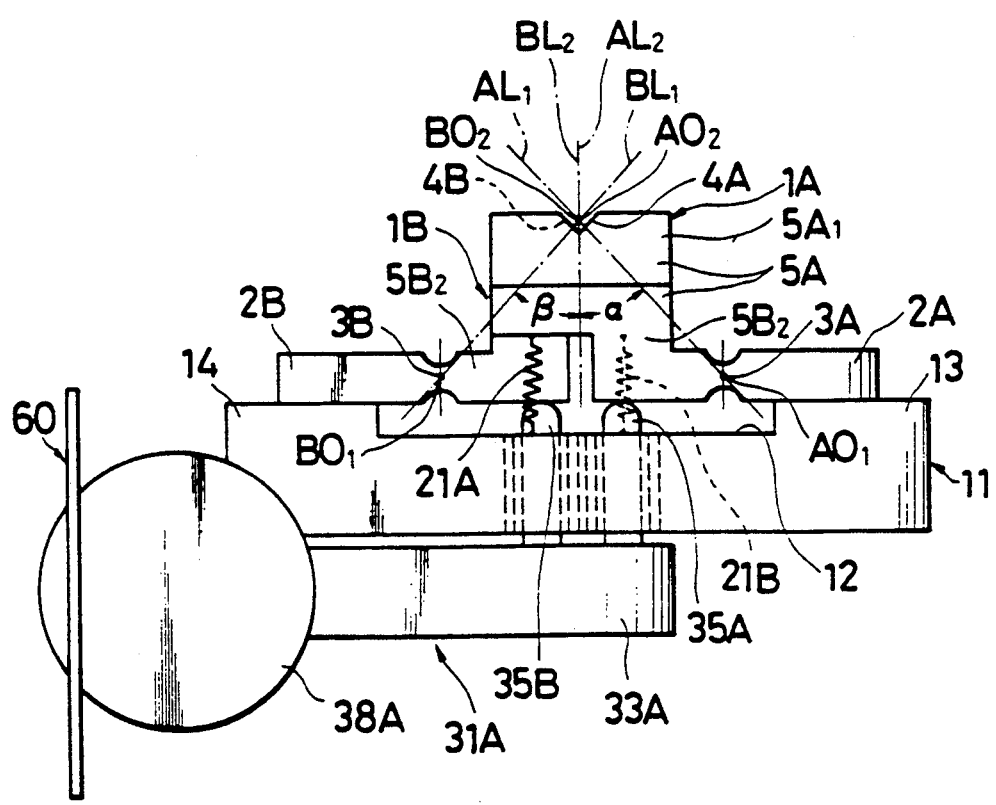
Figure 12:
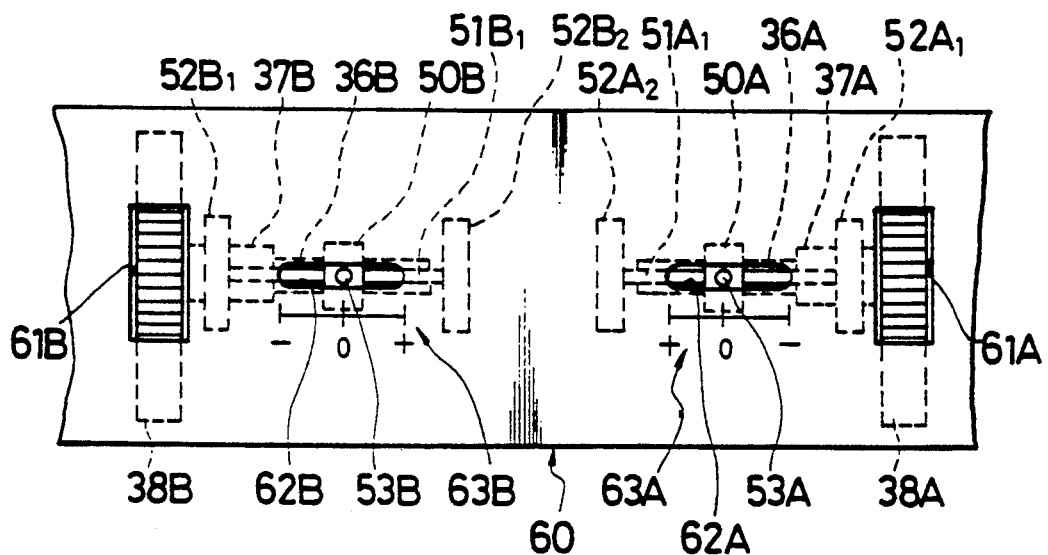
FIGS. 12 and 13 are front and sectional views showing a display plate of the centering and displaying means.
Figure 13:
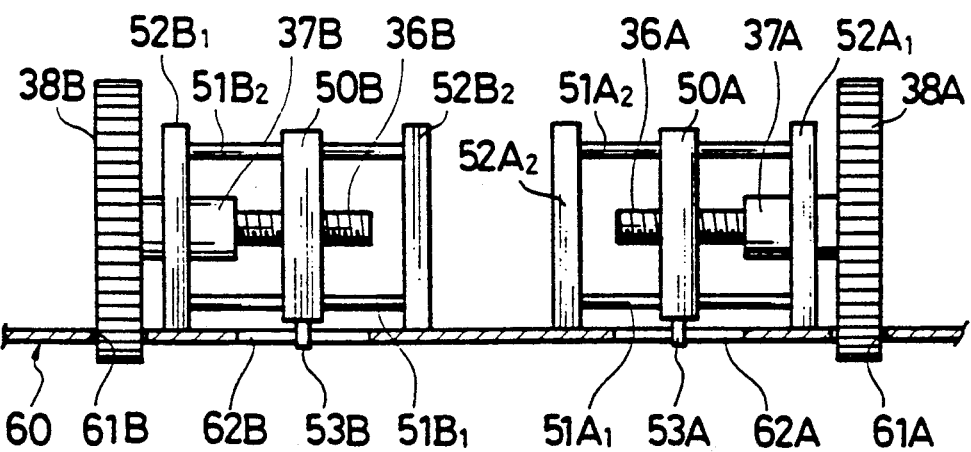
Figure 14:
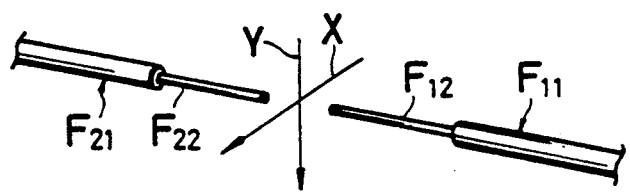
FIG. 14 is a perspective view of an example of axially centering optical fibers.
Figure 15:
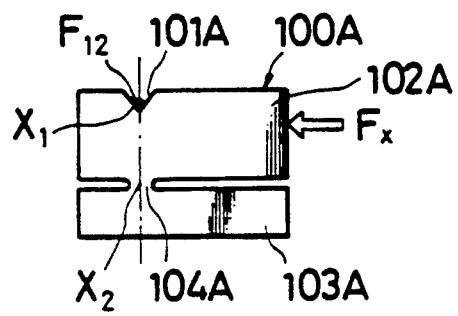
FIGS. 15 and 16 are side views showing conventional centering stands.
Figure 16:
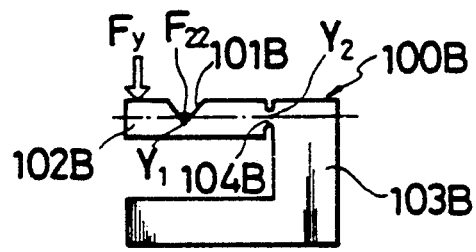
Figure 17:
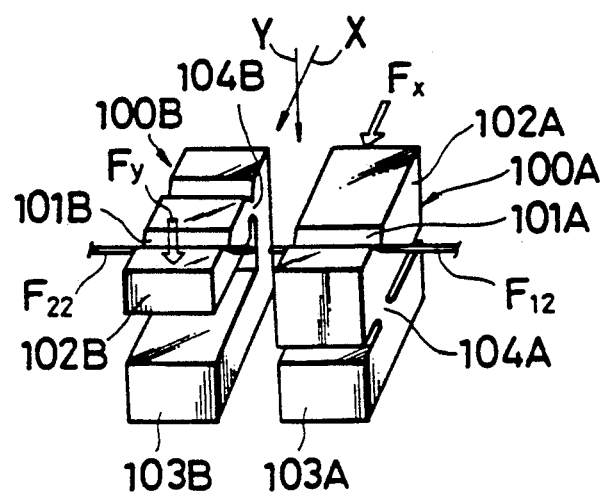
FIG. 17 is a perspective view showing the used example of the conventional centering stand.
Figure 18:
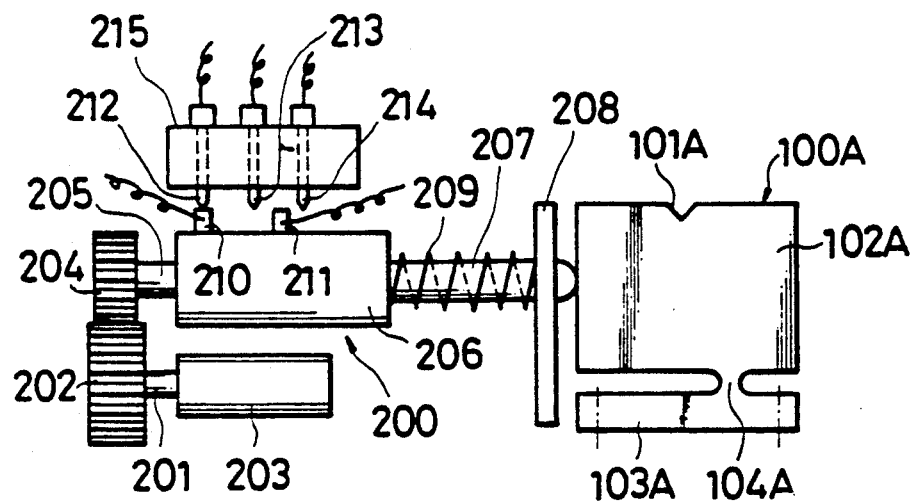
FIG. 18 is a side view schematically showing a coventional load imparting mechanism.

Both the centering mechanism 31A and 31B made of these members are associated, as apparent in FIG. 10, with the transmitting mechanism sections 33A and 33B in symmetrical state to each other.

More specifically, in one adjusting mechanism section 34A, the movable body 50A is penetrated through by one guide members $51A_1$, $51A_2$ installed in parallel between both supporting members $52A_1$ and $52A_2$ to be slidably supported to the guide members $51A_1$, $51A_2$ so that the output ends 36A of the micrometer 37A supported by the supporting member $52A_1$ and the movable body 50A are engaged by precise male and female threads formed oppositely in such a manner that one end (rear end) of the movable body 50A is contacted with the operating end of the transmitting mechanism section 33A and a tension type spring 22A is so attached to the transmitting mechanism section 33A to always contact with the movable body 50A side.

Similarly, in the other adjusting mechanism section 34B, the movable body 50A is penetrated through by one guide members $51B_1$, $51B_2$ installed in parallel between both supporting members $52B_1$ and $52B_2$ to be slidably supported to the guide members $51B_1$, $51B_2$ so that the output ends 36B of the micrometer 37B supported by the supporting member $52B_1$ and the movable body 50B are engaged by precise male and female threads formed oppositely in such a manner that one end (rear end) of the movable body 50B is contacted with the operating end of the transmitting mechanism section 33B and a tension type spring 22B is so attached to the transmitting mechanism section 33B to always contact with the movable body 50B side.

Indexes 53A and 53B made of needles are projected from the other ends (front ends) of the movable bodies 50A and 50B to correspond to displaying plate 70 to be described later.

Then, the displaying plates 70 reading the indexes 53A and 53B will be described.

In FIGS. 10 to 13, on the surfaces of the displaying plates 60 are formed a pair of operating holes 61A and 61B and a pair of index observers 62A and 62B formed by opening means, and a pair of index readers 63A and 63B formed through scale displaying means and printing means.

The interval of the operating holes 61A and 61B corresponds to that of both the centering dials 38A and 38B.

Both the index observers 62A and 62B have lengths over the moving ranges of the indexes 53A and 53B between both the operating holes 61A and 61B.

Both the index readers 63A and 63B display along the longitudinal directions of the index observers 63A and 63B near the index observers 62A and 63B.

The displaying plates 60 of such construction described above are disposed fixedly at the adjusting mechanism sections 34A and 34B of the centering mechanisms 31A and 31B, and when the displaying plates 60 are fixed, the centering dials 38A and 38B are respectively engaged partly within the operating holes 61A and 61B, and the positions of the indexes 53A and 53B can be observed and read through both the index readers 63A and 63B, Then, the using example of the apparatus of the invention will be described.

In FIG. 10 to 13, when the centering dial 38A of the adjusting mechanism section 34A of the centering mechanism 31A is rotated clockwise to move forward the output end 36A of the micrometer 37A in a predetermined direction (lateral direction in FIG. 10), the movable body 50A is pushed in the same direction through the output end 36A, and the transmitting mechanism section 33A is pushed clockwise through the movable body 50A.

Thus, when the transmitting mechanism section 33A is pushed clockwise and the movement is transmitted to the load imparting mechanism section 32A, the output end 35A of the load imparting mechanism section 32A is moved upward.

When the centering dial 38A of the adjusting mechanism section 34A of the centering mechanism 31B is, on the contrary, rotated counterclockwise to move backward the output end 36A of the micrometer 37A in a predetermined direction (rightward in FIG. 10), the transmitting mechanism section 33A is returned counterclockwise through the tension type spring 22A, the movement is transmitted to the micrometer 39A of the load imparting mechanism section 32A, thereby moving downward the output end 35B of the load imparting mechanism section 32A.

In the centering mechanism 31B is operated similarly, when the centering dial 38B of the adjusting mechanism section 34B is rotated clockwise or counterclockwise, the output end 36B of the adjusting mechanism section 34B is moved forward or backward in a predetermined direction (rightward or leftward in FIG. 10). Thus, the movements are transmitted through the movable bodies 50B, and the transmitting mechanism section 33B to the load imparting mechanism section 32B, thereby moving upward or downward the output end 35B of the load imparting mechanism section 32B.

Thus, when the centering dials 38A and 38B are rotated to move upward or downward the predetermined output ends 35A and 35B, the guides 5A and 5B of the centering stands 1A and 1B are elastically deformed as described above to finely displace the centers of the long grooves 4A and 4B of the guides 5A and 5B along the line segments $AL_1$ and $BL_1$ perpendicular to each other, thereby axially centering to bring the cores of both the optical fibers $F_{11}$ and $F_{21}$.

When the guides 5A and 5B of the centering mechanisms 31A and 31B are operated as described above, i.e., when the optical fibers are axially centered, the indexes 53A and 53B provided at the movable bodies 50A and 50B are observed by the index observers 62A and 62B of the displaying plates 60 to read the moved distances by the index readers 63A and 63B. Therefore, the adjusting states of the optical fiber guides 5A and 5B can be digitally grasped on the basis of the readings to obtain suitable and rational axial centering of the optical fibers.

In the embodiments in FIGS. 10 to 13, the following features may be employed.

For example, the supporting members $52A_2$ and $52B_2$ of both the adjusting mechanism sections 34A and 34B may be omitted to integrate (to one unit) the two guide members $51A_1$, $51B_1$ and $51A_2$. $51B_2$.

Both the adjusting mechanisms 34A and 34B are disposed symmetrical so that the centering dials 38A and 38B are separated to the utmost extent. However, both the centering dials 38A and 38B may be extremely symmetrical by inverting the adjusting mechanisms 34A and 34B at the right and left sides.

In this case, the operating holes 61A and 61B are disposed between both the index observers 62A and 62B in the displaying plates 60.

Both the adjusting mechanism sections 34A and 34B may be arranged in the state that the supporting members $52A_1$, $52A_2$, $52B_1$, $52B_2$ are disposed vertically, i.e., the supporting members $52A_1$, $52A_2$, $52B_1$, $52B_2$ may be disposed in parallel with the surface of the displaying plates 60.

The micrometers 37A and 37B of the adjusting mechanism sections 34A and 34B might be merely contacted at the output ends 36A and 36B with the movable bodies 50A and 50B.

Further, in the adjusting mechanisms 34A and 34B, the movable bodies 50A and 50B are omitted, and the output ends 35A and 36B of the micrometers 37A and 37B are engaged directly with the operating ends of the transmitting mechanism sections 33A and 33B.

In this case, the indexes 53A and 53B are provided at the ends (the ends of the levers) of the transmitting mechanism sections 33A and 33B.

The indexes 53A and 53B may be formed of linear displays instead of the needles, and the index observers 42A and 42B may be formed of transparent materials such as glass or plastic.

The above-mentioned centering displaying means are formed at the centering stands of optical fiber guides, fulcra, and substrates, and may be variously employed if the centering mechanisms are associated, and such centering and displaying means may be also applied to the apparatus which employ the centering stands in FIGS. 6 to 9 for those 1A and 1B.

According to the apparatus of the present invention as described above, a pair of centering stands of the same shape may be sufficient, and the pair of the centering stands may be disposed symmetrically. Therefore, even if the centering stands for vertical and horizontal axes are not prepared as the conventional example, the pair of optical fibers may be adjusted biaxially perpendicularly to the axes of the optical fibers. Since the pair of centering mechanisms are disposed at the output ends in the same plane, the centering mechanisms are not extended bulky in different directions, the entire apparatus can be set completely in a small size, and since the loads may be applied to the guides in the same direction, the operability of the apparatus is improved.

When the rotary powers input to the adjusting mechanism sections are output as linear powers in the apparatus of the invention, the input/output ratios from the adjusting mechanism sections to the transmitting mechanisms are largely reduced, the input/output ratio over the transmitting mechanism sections to the load imparting mechanism sections is also reduced by the transmission ratios of the transmitting mechanism sections, and the input/output ratios from the load imparting mechanism sections to the centering stands are also remarkably reduced by outputting the rotary powers as linear power in the same manner as described above.

Therefore, the operating amount from the adjusting mechanism sections may be minimized to be transmitted to the centering stands through the plurality of power transmission systems.

In addition, since large input/output ratio is not simultaneously obtained by a single mechanism section but the input/output ratio is increased by the combination of the adjusting mechanism sections, transmitting mechanism sections and load imparting sections, these mechanism sections are not overloaded, but sufficient accuracy can be obtained by the centering mechanism by employing the adjusting mechanism sections for outputting the rotary power as the linear power, the existing precise units such as the micrometers as load imparting mechanism sections and simple transmitting levers as the transmitting mechanism sections, and the construction may be reduced in size, simplified and enhanced in economy, According to the apparatus of the invention, the centering operation of the optical fibers can be accurately adjusted extremely finely when centering the optical fibers held by the centering stands.

Furthermore, when digital centering displaying means are associated with the axially centering means, the optical fiber adjusting state can be digitally grasped in case of axially centering the optical fibers as desired, and when the optical fibers are axially centered, suitable axially centering state is obtained while accurately grasping the centering state, and the data regarding the axially centering can be collected.

What is claimed is:

1. A centering mechanism for an axially centering apparatus for optical fibers, the centering mechanism comprising:
    a holder, connected to the centering mechanism, having long grooves for engaging optical fibers;
    a force transmitting lever, connected to the centering mechanism, having a pivot end and a free end;
    a load imparting mechanism section, located on an axis of rotation of the pivot end and in contact with the holder, which rotates with the force transmitting lever to impart force to the holder to move the holder; and
    an adjusting mechanism section, connected to the centering mechanism, abutting the free end of the force transmitting lever and exerting force on the force transmitting lever to cause rotation of the force transmitting lever about the axis of rotation of the pivot end to axially center an optical fiber and
    wherein the adjusting mechanism section includes an actuator operatively connected to a first axially telescopic spindle which abuts the free end of the force transmitting lever such that rotation of the actuator causes a linear motion of the first axially telescopic spindle, causing the force transmitting lever to rotate about the axis of rotation of the pivot end; and
    wherein the load imparting mechanism section includes a second axially telescopic spindle, connected to the holder at one end of the second axially telescopic spindle and connected to the force transmitting lever at another end of the second axially telescopic spindle, which translates rotation of the force transmitting lever about the axis of rotation into a linear movement along the axis of rotation to impart force upon the optical fiber.

* * * * *